United States Patent [19]
Lim et al.

[11] Patent Number: 5,300,976
[45] Date of Patent: Apr. 5, 1994

[54] MOVIE CAMERA SYSTEM HAVING VIEW FINDING AND PROJECTING OPERATIONS

[75] Inventors: Jae C. Lim, Incheon-si; Myung K. Yeo, Kyungki-do; Yong T. Lim, Seoul; Nam S. Lee, Kyungki-do; Jin W. Seo, Seoul; Dae S. Shim, Incheon-si, all of Rep. of Korea

[73] Assignee: Goldstar Co., Ltd., Seoul, Rep. of Korea

[21] Appl. No.: 47,442

[22] Filed: Apr. 16, 1993

[30] Foreign Application Priority Data

| Apr. 17, 1992 [KR] | Rep. of Korea | 6432/1992 |
| Nov. 16, 1992 [KR] | Rep. of Korea | 21486/1992 |
| Feb. 18, 1993 [KR] | Rep. of Korea | 2247/1993 |

[51] Int. Cl.$^5$ .............. G03B 13/02; H04N 5/30; H04N 9/31
[52] U.S. Cl. ................ 354/219; 352/138; 348/333; 348/766
[58] Field of Search ............ 354/219; 358/224, 231, 358/60; 352/136, 138

[56] References Cited
U.S. PATENT DOCUMENTS 5,185,712 2/1993 Sato et al. .................. 358/224

FOREIGN PATENT DOCUMENTS 1-115371 8/1989 Japan.

*Primary Examiner*—Michael L. Gellner
*Assistant Examiner*—J. K. Han
*Attorney, Agent, or Firm*—Finnegan, Henderson, Farabow, Garrett & Dunner

[57] ABSTRACT

An electronic movie camera system having a projecting function as well as a view finding function. The system includes a system body, a housing mounted on the system body, an LCD panel disposed within the housing to display an image corresponding to an image signal received from the system body, a focusing lens unit mounted to one end of the housing disposed rearwardly of the LCD panel and adapted to project the displayed image on an external screen, a back light disposed rearwardly of the LCD panel to emit a view finding light, a polarizing plate disposed forwardly of the LCD panel, a view finder coupling unit selectively attached to the other end of the housing disposed forwardly of the LCD panel, the view finder coupling unit having an eye lens, and a projector coupling unit selectively attached to the other end of the housing, the projector coupling unit having a light source for emitting a projecting light and a condensing lens for the projecting light, whereby the movie camera system is capable of both a view finding operation and a projecting operation.

21 Claims, 9 Drawing Sheets

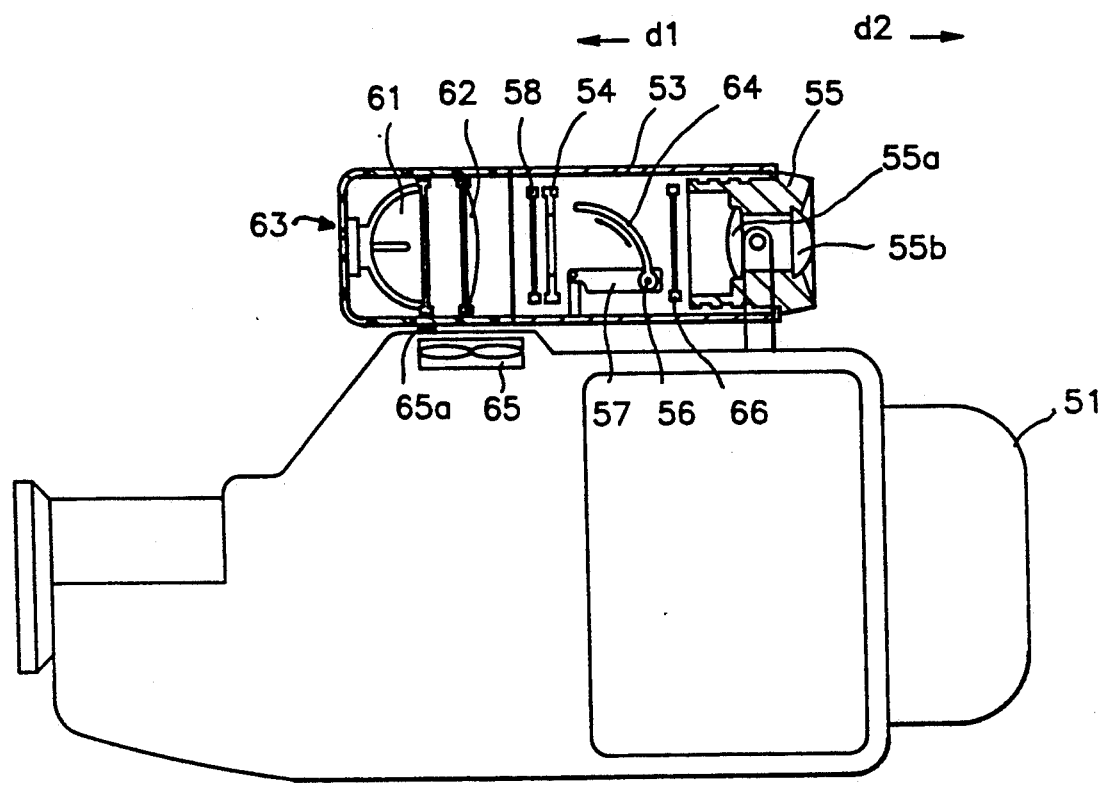

MOVIE CAMERA SYSTEM HAVING VIEW FINDING AND PROJECTING OPERATIONS

BACKGROUND OF THE INVENTION

1. Field of the Invention

The present invention relates to movie camera systems more particularly, to a movie camera system having a projecting operation as well as a view finding operation.

2. Description of the Prior Art

Generally, an electronic movie camera system is called a "camcorder," and comprises essentially three parts: a video cassette recorder (VCR) for recording a video signal of an object being shot or photographed, a camera for reading an image of the object, and a view finder for monitoring the resultant video picture. One example of this form of movie camera system is schematically shown in a block form in FIG. 1.

As shown in FIG. 1, the conventional electronic movie camera system comprises a camera section 1 for shooting or imaging an object and converting the result into an electrical video signal, a video signal processing circuit 2 for producing a composite video signal based on the video signal from the camera section 1, the composite video signal including luminance and color signals, a VCR section 3 having a recording part 3b for recording the composite video signal from the video signal processing circuit 2 on a VCR tape and a playback part 3a for playing back the composite video signal recorded on the VCR tape, and a view finder circuit 4 for processing the composite video signal from the VCR section 3 or from the video signal processing circuit 2 so that the composite video signal can be displayed on a liquid crystal display (LCD) device or panel 5a of a view finder 5. The view finder 5 is adapted to display the processed video signal from the view finder circuit 4 on the LCD device 5a thereof so that the user can monitor an image of the object being presently or previously imaged.

Referring to FIG. 2a, a schematic sectional view of the view finder 5 in FIG. 1 is shown. As shown in this figure, the view finder 5 includes a view finder housing 5b, the LCD panel 5a disposed in the view finder housing 5b, a first polarizing plate 5c disposed at the front of the LCD panel 5a, a second polarizing plate 5d positioned at the rear of the LCD panel 5a, a light source 5e disposed adjacent to the rear of the second polarizing plate 5d, and an eye lens 5f positioned at the front of the first polarizing plate 5c.

In FIG. 2b, a schematic block diagram of the view finder circuit 4 in FIG. 1 is shown. The view finder circuit 4 includes a signal processor 4a for processing a composite video signal from the VCR section 3 or from the video signal processing circuit 2 so that the composite video signal can be displayed on the LCD panel 5a of the view finder 5, an LCD driver 4b for driving the LCD panel 5a of the view finder 5 to display the processed video signal from the signal processor 4a on the LCD panel 5a, a synchronization controller 4c for synchronizing vertical and horizontal portions of the video signal being displayed on the LCD panel 5a, and a light source driver 4d for driving the light source 5e of the view finder 5 so that the light source 5e can provide a back light to the LCD panel 5a. The camcorder containing this form of LCD view finder is available from the SONY or SANYO Company, Japan, for example.

The operation of the conventional movie camera system with the above-mentioned construction will be described hereinafter.

First, the camera section 1 images an object and outputs the resultant electrical video signal to the video signal processing circuit 2, which produces a composite video signal based on the video signal from the camera section 1 and outputs the composite video signal to the VCR section 3. The composite video signal is comprised of luminance and color signals Y and C. Upon receiving the composite video signal from the video signal processing circuit 2, the recording part 3b of the VCR section 3 records the received composite video signal on the VCR tape. The composite video signal from the video signal processing circuit is also transferred to the view finder circuit 4, which performs a process such that the composite video signal can be displayed on the LCD panel 5a of the view finder 5. The processed video signal from the view finder circuit 4 is provided for the LCD panel 5a of the view finder circuit 5, resulting in a desired image being displayed on the LCD panel 5a.

The desired image is displayed on the LCD panel 5a, which is lighted in a proper amount by the light source 5e, so that the user can image (or shoot) the object, while viewing the image on the LCD panel 5a through the eye lens 5f. In this manner, the user, while imaging an object, can monitor through the view finder 5 the played back video signal from the VCR tape as well as the image of the object.

In FIG. 3a, a schematic sectional view of a conventional projector 6 is shown. The conventional projector 6 includes a projector housing 6a, an LCD panel 6b disposed centrally in the projector housing 6a, a first polarizing plate 6c positioned at the front of the LCD panel 6b, a second polarizing plate 6d positioned at the rear of the LCD panel 6b, a light source 6e located at a certain distance from the rear of the second polarizing plate 6d, and a projector lens 6f disposed at an opening of the projector housing 6a.

In FIG. 3b, a schematic block diagram of a projector circuit 7 is shown for operating the projector 6 shown in FIG. 3a. As shown in FIG. 3b, the projector circuit 7 includes a signal processor 7a for processing any one of video signals from a VCR, a movie camera and a television receiver so that the video signal can be displayed on the LCD panel 6b of the projector 6, an LCD driver 7b for driving the LCD panel 6b of the projector 6 to display the processed video signal from the signal processor 7a on the LCD panel 6b, a synchronization controller 7c for synchronizing vertical and horizontal portions of the video signal being displayed on the LCD panel 6b, a light source controller 7d for controlling an amount of light from the light source 6e, and an audio signal processor 7e for processing any one of audio signals from the VCR, the movie camera and the television receiver so that the audio signal can be outputted through a speaker SP. This form of projector may be available from the SANYO or FUJIZ Company, Japan, for example.

The operation of the conventional projector with the abovementioned construction will be described hereinafter with reference to FIGS. 3a and 3b.

First, a selected one of the video signals from the VCR, the camcorder and the television receiver is processed by the signal processor 7a so that the selected video signal can be displayed on the LCD panel 6b, and then applied to the LCD driver 7b. The LCD driver 7b drives the LCD panel 6b, thereby displaying the output signal from the signal processor 7a on the LCD panel 6b. At this time, the synchronization controller 7c synchronizes the vertical and horizontal portions of the video signal being displayed on the LCD panel 6b and the light source controller 7d controls an amount of light from the light source 6e so that the video signal displayed on the LCD panel 6b can be projected on a screen.

Accordingly, the video signal on the LCD panel 6b is condensed on the projector lens 6f by a proper amount of light from the light source 6e and then projected to a screen at the front, resulting in a desired image being displayed on the screen.

However, the above-mentioned conventional arts have the following disadvantages.

First, only one person can monitor the image of the object presently or previously displayed in the view finder of the conventional movie camera. For example, when many persons picnic out of town, they cannot simultaneously monitor the object being presently or previously imaged since a separate monitor or television receiver is not present in the fields.

Second, it is inconvenient to connect the movie camera system to the television receiver or monitor when many persons, in a home or office, are to view simultaneously the object imaged by the movie camera system, although the monitor or television receiver is present in the home or office. Also, it is not possible to provide a wide screen for many persons because the screen of the television receiver or monitor is limited in size.

Third, it is required to connect a separate projector to the movie camera system when many persons are to view simultaneously the object imaged by the movie camera system through a wide screen.

Fourth, when the user wishes to view the image of an object provided by the movie camera system through a wide screen such as a screen in a cinema house, for example, he or she must purchase a separate projector, suffering a heavy economical burden.

SUMMARY OF THE INVENTION

The present invention has been made in view of the above problems, and it is an object of the present invention to provide an electronic movie camera system having a capability of projecting an image of an object presently or previously imaged on an external screen as well as a capability for monitoring the image.

It is another object of the present invention to provide a method of displaying a video signal from a camera section or a VCR section on an LCD panel of a view finder or projecting it on an external screen through the LCD panel in a movie camera system having the view finder integrated within the camera section and the VCR section.

In one aspect of the present invention, a movie camera system is provided and comprises: a system body; a housing mounted on an upper portion of the system body; a display element disposed within the housing and adapted to display an image based on an image signal received from the system body; a focusing lens unit mounted at one end of the housing disposed rearwardly of the display element and adapted to project the displayed image on an external screen; a back light disposed rearwardly of the display element to emit a view finding light; a polarizing plate disposed forwardly of the display element; a view finder coupling unit selectively attached to the other end of the housing disposed forwardly of the display element, the view finder coupling unit having an eye lens; and a projector coupling unit selectively attached to the other end of the housing, the projector coupling unit having a light source for projecting light and a condensing lens for the projected light, whereby the movie camera system has both a view finding function and a projecting function.

In accordance with another aspect, the present invention provides a movie camera system comprising: a system body; a housing fixedly mounted on an upper portion of the system body; a light source disposed within the housing and mounted to one end of the housing, the light source being adapted to provide a light for a view finding operation or a projecting operation; a condensing lens disposed forwardly of and near the light source; a polarizing plate disposed forwardly of the condensing lens; a display element rotatably disposed forwardly of the polarizing plate to be vertically invertible and adapted to display an image based on an image signal received from the system body; and a focusing lens unit disposed within the housing and fixedly mounted to the other end of the housing, the focusing lens unit being adapted to selectively enable the displayed image to be seen therethrough and project the displayed image on an external screen, whereby the movie camera system has both a view finding function and a projecting function.

BRIEF DESCRIPTION OF THE DRAWINGS

The above and other objects, features and advantages of the present invention will be more clearly understood from the following detailed description taken in conjunction with the accompanying drawings, in which:

FIGS. 6b and 6c are views showing conditions of an LCD panel equipped in the movie camera system shown in FIG. 6a.

DETAILED DESCRIPTION OF THE PREFERRED EMBODIMENTS

Figure 1:
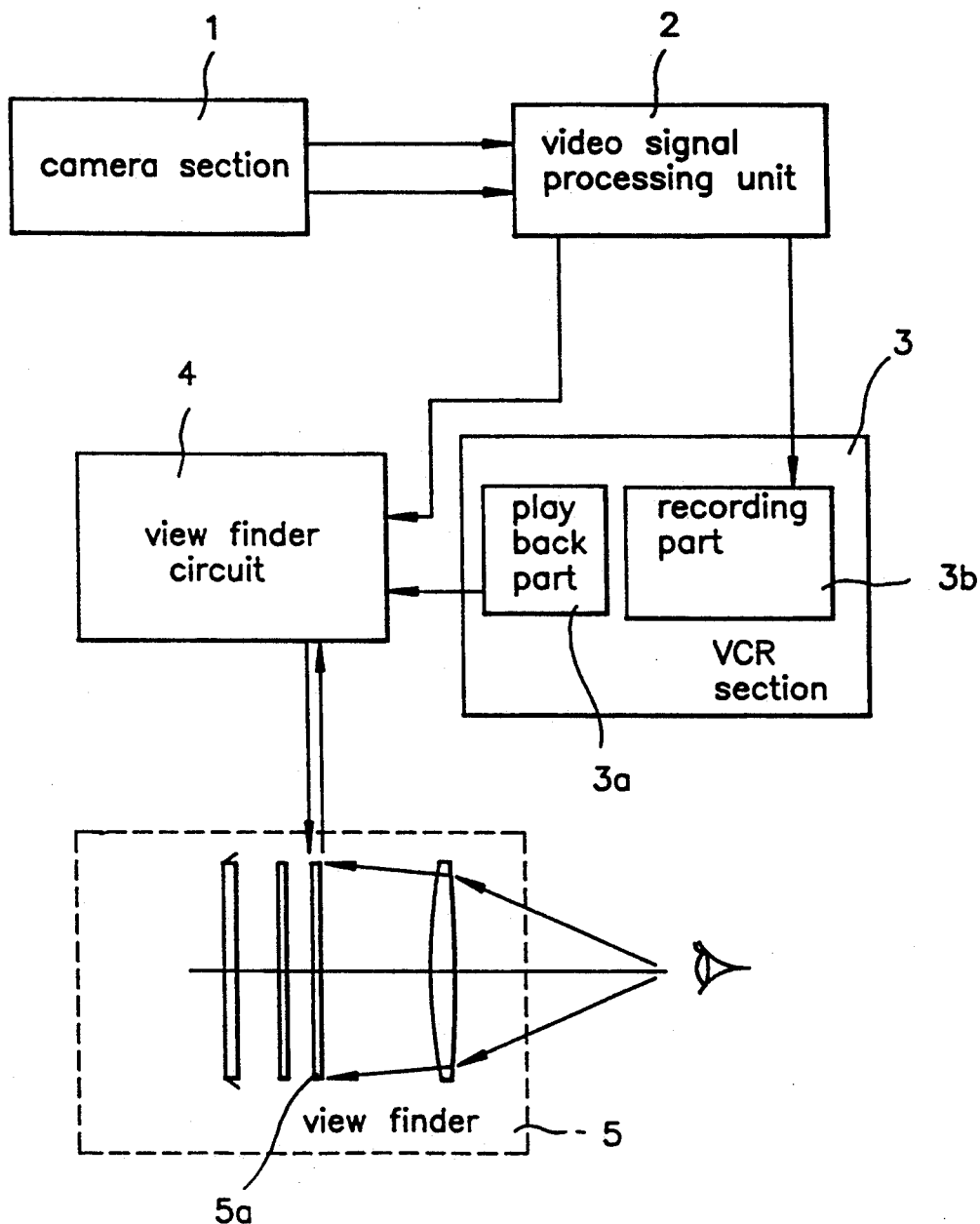
FIG. 1 is a schematic block diagram of a conventional movie camera system.
Figure 2A:
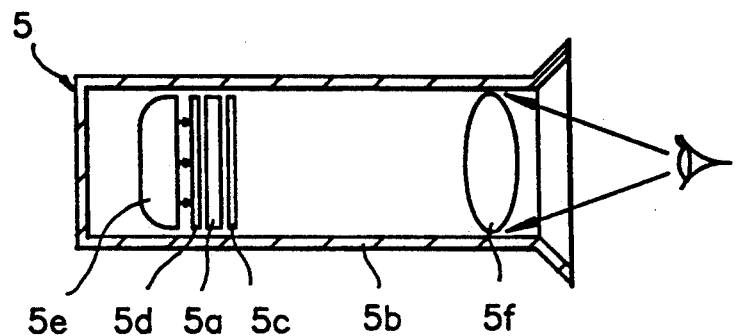
FIG. 2a is a schematic sectional view of a view finder in FIG. 1.
Figure 2B:
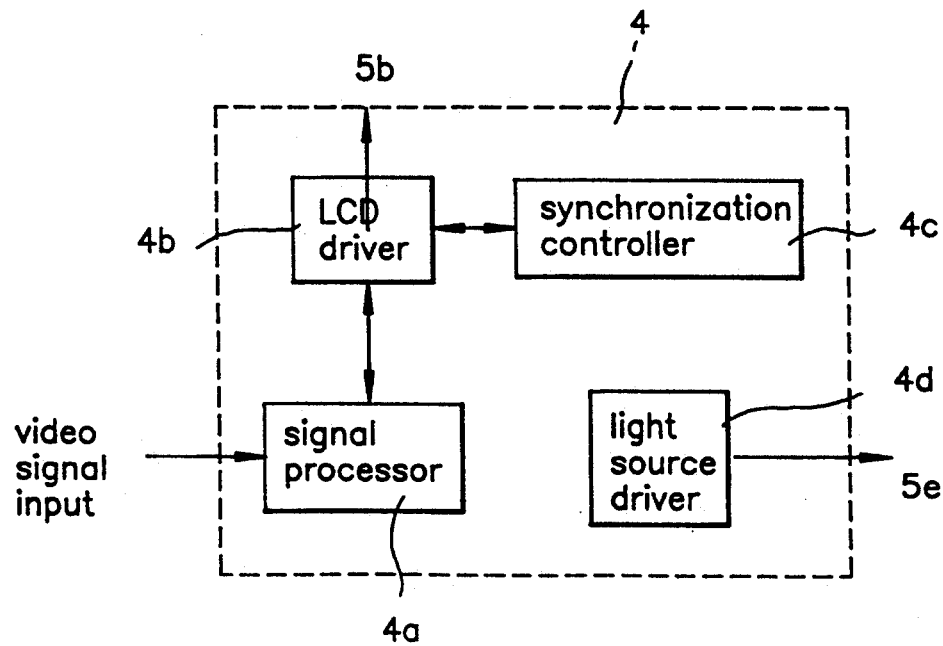
FIG. 2b is a schematic block diagram of a view finder circuit in FIG. 1.
Figure 3A:
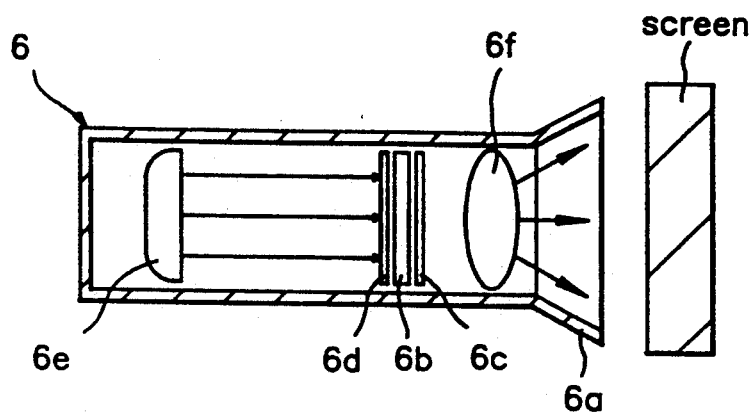
FIG. 3a is a schematic sectional view of a conventional projector.
Figure 3B:
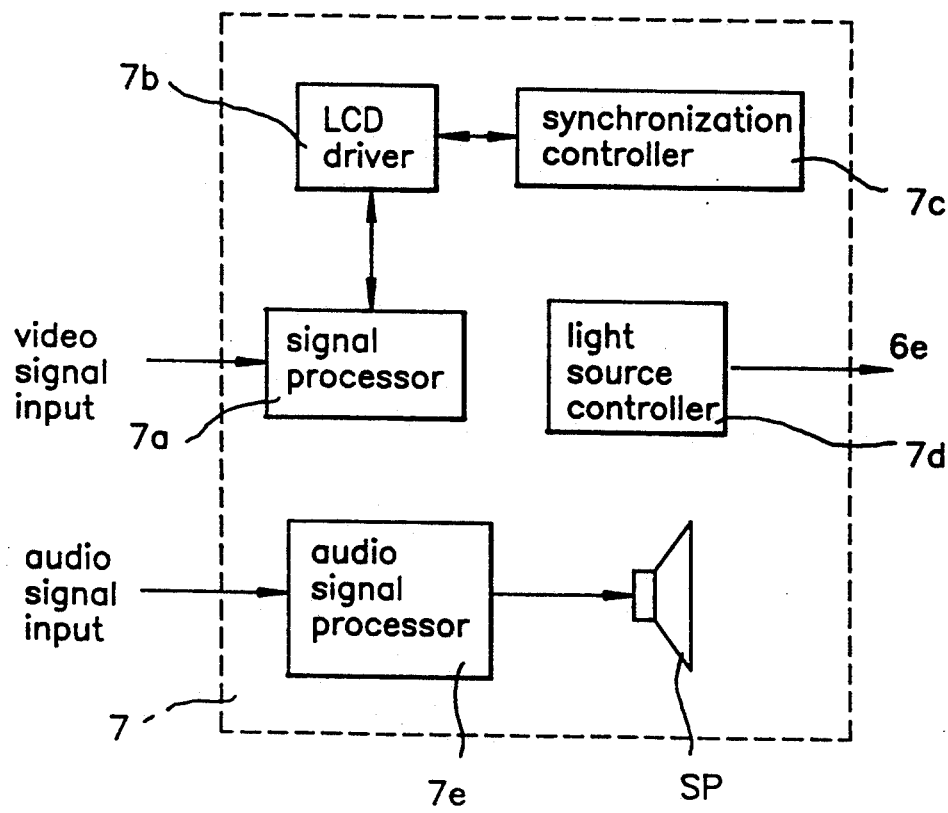
FIG. 3b is a schematic block diagram of a conventional projector circuit.
Figure 4A:
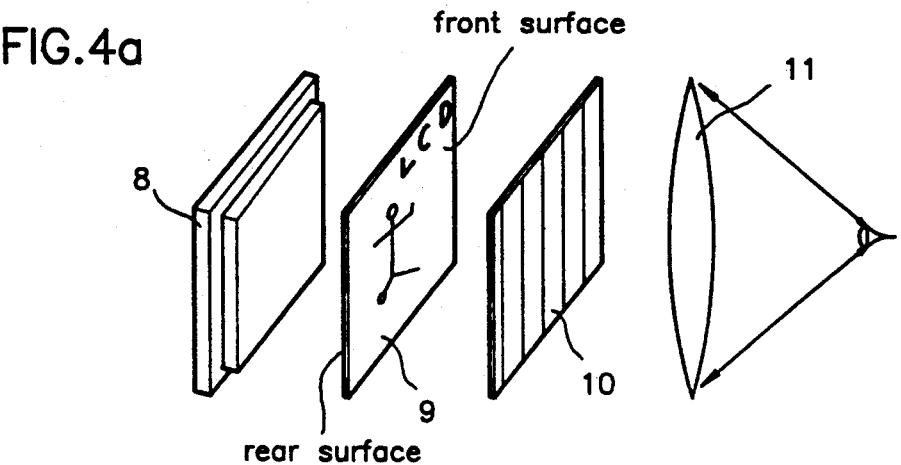
FIGS. 4a to 4c are schematic views explaining the principle of a view finder of a movie camera system in accordance with the present invention.
Figure 4B:
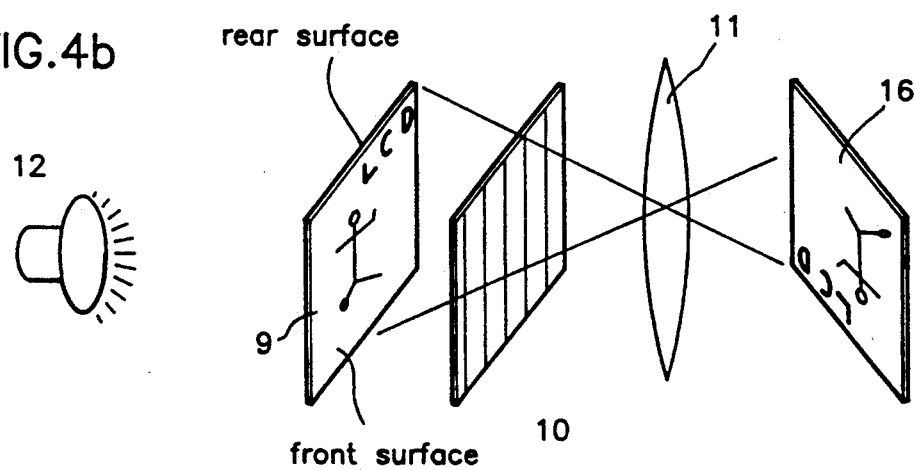
Figure 4C:
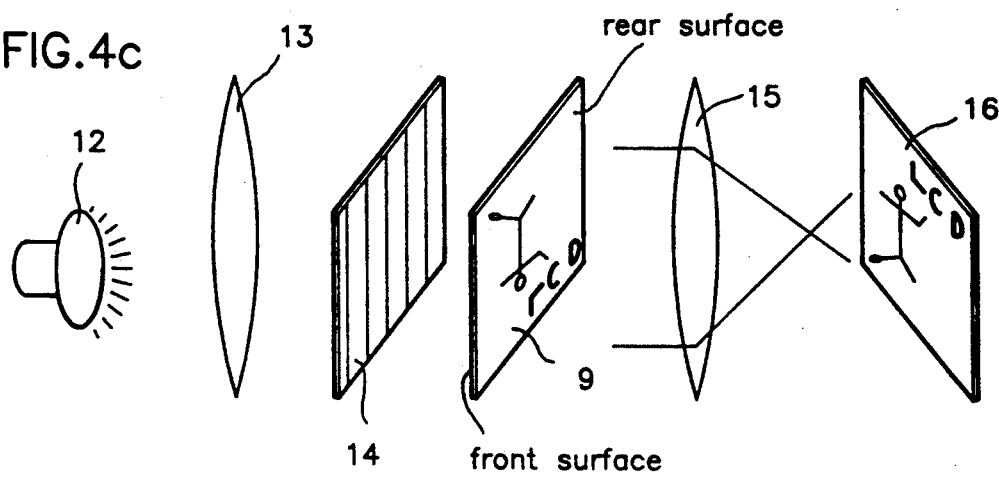

FIGS. 4a to 4c are schematic views provided to explain the principle of a view finder of a movie camera system in accordance with the present invention. As a small amount of light emitted from a back light 8 is transmitted to the rear surface of an LCD panel 9, as shown in FIG. 4a, the user can see an image displayed on the LCD panel 9 through a eye lens 11 and a polarizing plate 10. Where the image displayed on the LCD panel 9 of this view finder is projected on an external screen, however, a light source having a larger light quantity, such as a halogen lamp, should be used in place of the back light 8.

FIG. 4b shows a condition where light is transmitted to the rear surface of LCD panel 9 using a halogen lamp 12 in place of the back light 8. In this case, however, an image projected on a screen is at a state point-symmetrical to an original image, that is, a state vertically and laterally inverted from the original image.

For solving such a problem, the LCD panel 9 may be rotated through an angle of 180° so that the image displayed thereon in an inverted state is vertically inverted again, as shown in FIG. 4c. In this case, light emitted from the halogen lamp 12 is transmitted to the front surface of LCD panel 9 through a condensing lens 13 and a polarizing plate 14.

In such a case, where a large amount of light is transmitted to the front surface of LCD panel 9, vertically inverted for the purpose of vertically inverting the image displayed thereon, an image projected on a screen 16 has the same orientation as the original image.

The following embodiments of the present invention use the above-mentioned principle, so as to construct movie camera systems having the projecting function as well as the view finding function.

First Embodiment

For achieving both the view finding and projecting functions in accordance with the above-mentioned principle of the present invention, it is required to provide a light source capable of adjusting the quantity of light between a high level, such as light from a halogen lamp, and a low level, a construction for rotating an LCD panel to invert it vertically, and a construction for making a halogen lamp transmit light to the rear surface of the LCD panel for carrying out the view finding function and to the front surface of the vertically inverted LCD panel for carrying out the projecting function.

Figure 5A:
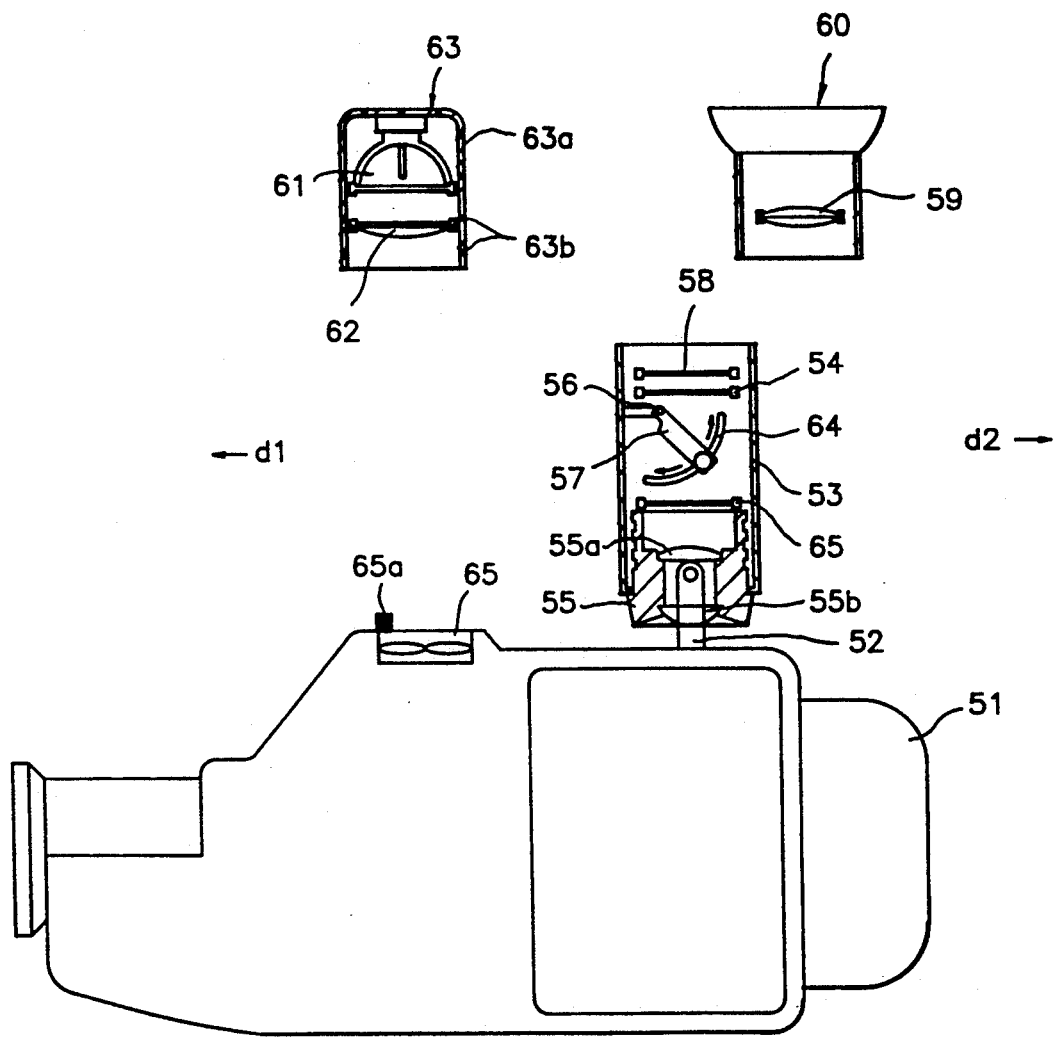
FIG. 5a is a view illustrating a movie camera system according to a first embodiment of the present invention; of the movie camera shown in FIG. 5a, respectively.

In FIG. 5a, there is illustrated a movie camera system according to a first embodiment of the present invention. As shown in FIG. 5a, the movie camera system comprises a system body 51 and a housing 53 rotatably mounted above the upper portion of system body 51 by means of a bracket 52 fixedly mounted to the upper portion. Within the housing 53, an LCD panel 54 is disposed to display an image based on an image signal received from the system body 51. A focusing lens unit 55 is mounted to one end of the housing 53 rearwardly of the LCD panel 54. The focusing lens unit 55 is adapted to project the displayed image on an external screen. Rearwardly of the LCD panel 54, a back light 57 is disposed to emit light for the view finder. The back light 57 is pivotally mounted at one end to a hinge member 56 mounted to the housing 53 so that it can rotate through an angle of 90° according to a rotation of the housing 53. A polarizing plate 58 is forward of the LCD panel 54. A view finder coupling unit 60 is selectively attachable to the other end of housing 53 forwardly of the LCD panel 54. The view finder coupling unit 60 is provided with an eye lens 59. To the other end of housing 53, a projector coupling unit 63 may be selectively attachable. The unit 63 has a light source 61 for emitting light for the projector and a condensing lens 62 for the light.

The back light 57 is engaged at the other end thereof with a guide groove 64 formed at the housing 53 so that rotation of the back light 57 can be guided along the guide groove 64.

On the upper portion of system body 51, a fan 65 is also disposed rearwardly of the housing 53, so as to discharge heat generated from the light source 61.

In FIG. 5a, the reference numeral 65a designates a switch for driving the fan 65.

The projector coupling unit 63 includes a housing 63a and a plurality of heat discharge ports 63b for discharging outwardly heat generated from the light source 61. The light source 61 disposed in the projector coupling unit 63 may be a halogen lamp.

In addition, a polarizing plate 66 may be disposed between the focusing lens unit 55 and the back light 57, so as to enhance the resolution of the image projected on the screen.

Although the focusing lens unit 55 is shown in FIG. 5a as including two convex lenses 55a and 55b, it may include three or more convex lenses or concave lenses.

In accordance with the first embodiment, the LCD panel 54 is used as a display element. Other transmission display elements may be also used.

The operation of the movie camera system with the abovementioned construction shown in FIG. 5a will now be described, in conjunction with FIGS. 5b and 5c.

Figure 5B:
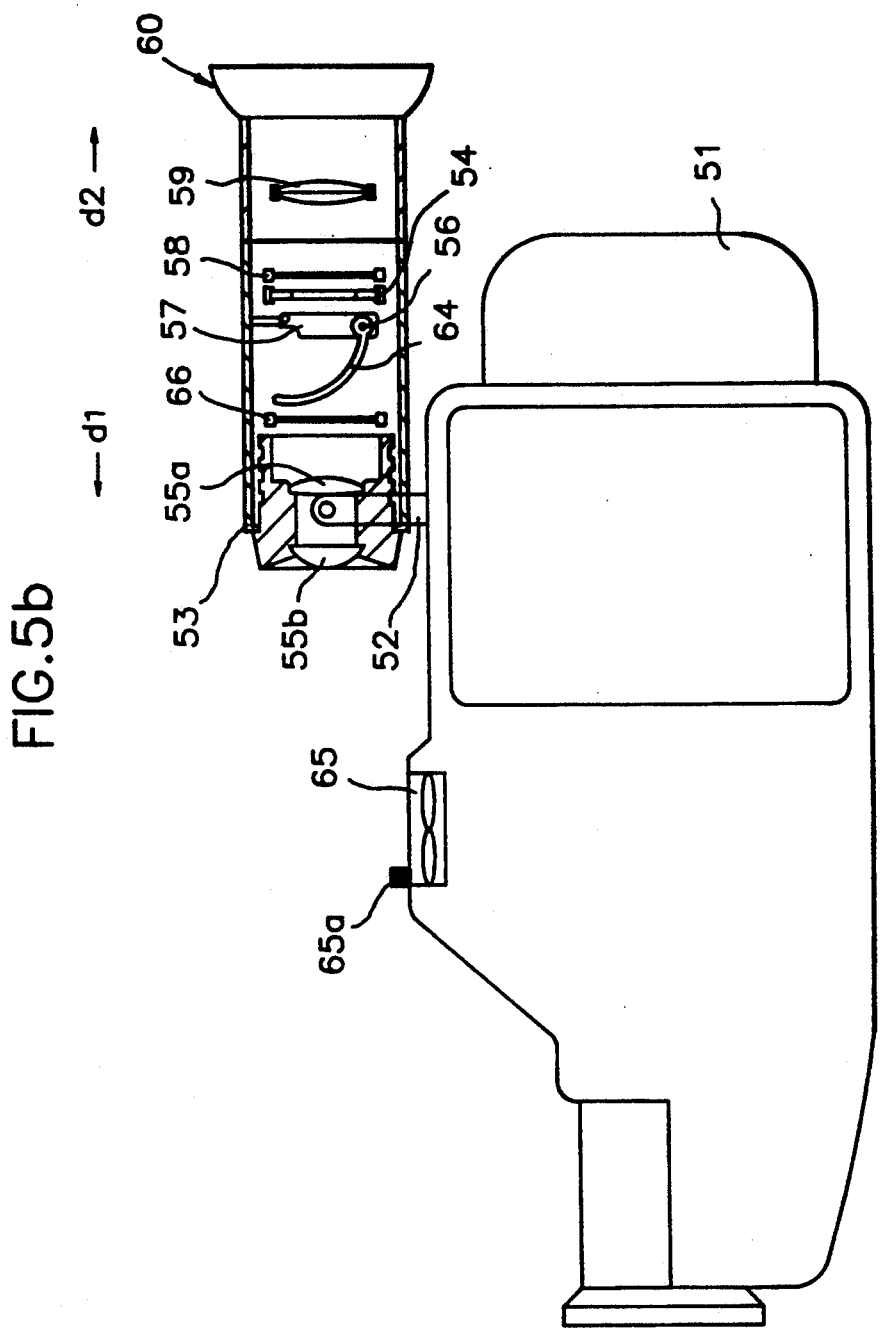

FIG. 5b shows a condition of the movie camera system for carrying out its view finding function.

For carrying out the view finding function, first, the user fits the view finder coupling unit 60 to one end of the housing 53 forwardly of the LCD panel 54, as shown in FIG. 5b. Thereafter, the housing 53 is rotated in a direction indicated by an arrow d2 of FIG. 5b. At this time, the back light 57 is rotated 90° along the guide groove 64 so that it is positioned near the rear surface of LCD panel 54, in order to transmit a small amount of light thereto.

Also, the LCD panel 54 is activated to display an image. As the LCD panel 54 displays an image based on image signals received from the system body 51, the user can see the image through the polarizing plate 58 and the eye lens 59 equipped in the view finder coupling unit 60, as shown in FIG. 4a. Although not shown, the image signals are those received from a camera unit or a VCR unit of the system. Generally, the movie camera system is equipped with such camera and VCR units in the system body 51.

During the operation mentioned above, the focusing lens unit 55 mounted to the other end of housing 53 does not perform any function.

On the other hand, FIG. 5c shows a condition of the movie camera system for carrying out its projecting function.

For carrying out the projecting function, first, the user fits the projector coupling unit 63 to one end of the housing 53 disposed forwardly of the LCD panel 54, in place of the view finder coupling unit 60, as shown in FIG. 5c. Thereafter, the housing 53 is rotated in a direction indicated by an arrow d1 of FIG. 5c. At this time, the back light 57 moves along the guide groove 64 and away from the rear surface of LCD panel 54 to be positioned near the inner surface of the housing 53, namely, its bottom surface in FIG. 5c.

Since the housing 53 rotates in the direction d1, the image displayed on the LCD panel 54 according to the image signals received from the system body 51 is in a vertically inverted state, as shown in FIG. 4c.

Also, the light source 61 of the projector coupling unit 63 fitted to one end of the housing 53 transmits a large amount of light to the front surface of the vertically inverted LCD panel 54. Accordingly, the image displayed on the LCD panel 54 is projected on an external screen through the focusing lens 55, by the light.

As a result, an image which is vertically and laterally identical to an original image can be displayed on the screen, as shown in FIG. 4d.

During the operation mentioned above, the fan-driving pushbutton switch 64a is maintained at its pushed-down state by the housing 53, so that the wind generated by the fan 65 cools the heat generated from the light source 61 of the projector coupling unit 63.

Second Embodiment

Similarly to the first embodiment, the second embodiment is constructed so that an image displayed on an LCD panel, upon the view finding operation, is vertically inverted upon the projecting operation, while a light source transmits light to the front surface of the LCD panel.

Figure 6A:
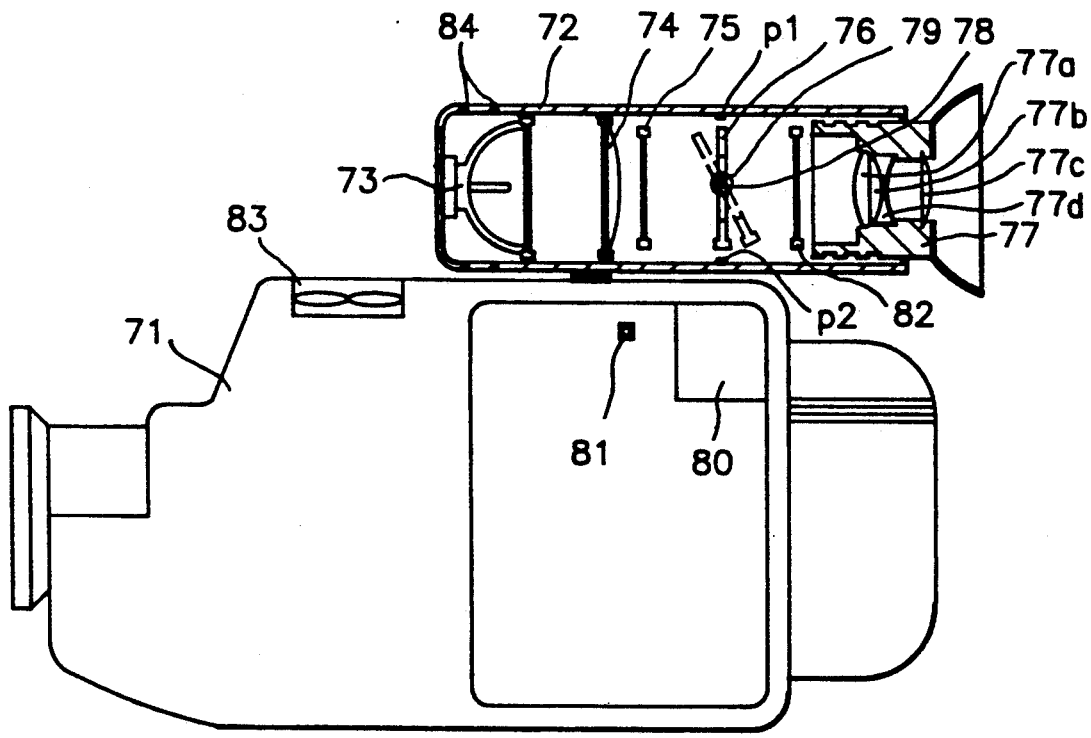
FIG. 6a is a view illustrating a movie camera system according to a second embodiment of the present invention.

In FIG. 6a, there is illustrated a movie camera system according to the second embodiment of the present invention. As shown in FIG. 6a, the movie camera system comprises a system body 71 and a housing 72 fixedly mounted on the upper portion of system body 71. Within the housing 72, a light source 73 is mounted to one end of the housing 72. The light source 73 is capable of adjusting the amount of light, so as to provide light for the view finding function and the projecting function. A condensing lens 74 is disposed near and forwardly of the light source 73. Forwardly of the condensing lens 74, a polarizing plate 75 is disposed. Also, an LCD panel 76 is disposed forwardly of the polarizing plate 75 to display an image based on an image signal received from the system body 71. A focusing lens unit 77 is mounted to the other end of the housing 72 and adapted to enable the displayed image to be seen therethrough or project the displayed image on an external screen. In accordance with the second embodiment, the LCD panel 76 is used as a display element. Other transmission display elements may be also used. In accordance with this embodiment, the LCD panel 76 has a shaft 78, rotatably mounted at both ends to the housing 72, and a lever or knob 79 mounted to one end of the shaft 78 outwardly protruded from the housing 72. With such a construction, the LCD panel 76 can be rotated manually or by a rotation of a motor 80 driven according to the manipulation of a motor driving switch 81.

The light source 73 may be a halogen lamp and the amount of light from the halogen lamp can be adjusted, depending on the view finding function or the projecting function.

In addition, a polarizing plate 82 may be disposed between the LCD panel 76 and the focusing lens unit 77, so as to enhance the resolution of the image projected on the screen.

At the upper portion of system body 71, a fan 83 is also disposed beneath the light source 73, so as to discharge heat from the light source 73. The housing 72 also has a plurality of heat discharge ports 84 at a position where the light source 73 is disposed, so as to discharge outwardly heat generated from the light source 73.

Although the focusing lens unit 77 is shown in FIG. 6a as including two convex lenses 77a and 77b, and a convex lens 77c, and a concave lens it may include more convex and concave lenses, so as to remove optical noise.

The operation of the movie camera system with the abovementioned construction shown in FIG. 6a will now be described in conjunction with FIGS. 6b and 6c.

Figure 6B:
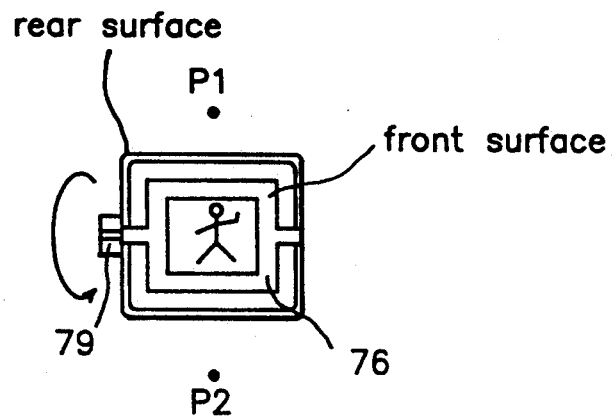

For carrying out the view finding function, first, the user rotates manually the LCD panel 76 by using the knob 79 fixedly mounted to the shaft 78 of the LCD panel 76 so that the upper and lower surfaces of the LCD panel 76 are positioned at points $P_1$ and $P_2$, respectively, as shown in FIG. 6b. That is, the LCD panel 76 is rotated to its normal position.

The LCD panel 76 may be automatically rotated by the motor 80 by activating the motor driving switch 81.

At this time, the light source 73 emits a small amount of light that is proper for the view finding operation. This light is transmitted to the rear surface of the LCD panel 76.

When the LCD panel 76 is positioned at its vertically normal position, the light source 73 is positioned to face the rear surface of LCD panel 76. On the contrary, when the LCD panel 76 is positioned at its vertically inverted position, the light source 73 is positioned to face the front surface of LCD panel 76.

The LCD panel 76 displays an image based on image signals received from the system body 71, and the user can see the normally displayed image through the focusing lens unit 77 and the polarizing plate 8, as shown in FIG. 4a.

Figure 6C:
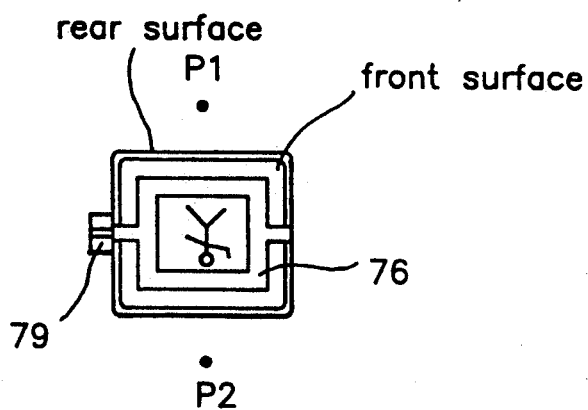

For carrying out the projecting function, first the user rotates manually the LCD panel 76 by using the knob 79 so that the upper and lower surfaces of the LCD panel 76 are positioned at points $P_2$ and $P_1$, respectively, as shown in FIG. 6c. That is, the LCD panel 76 is rotated to its inverted position.

Alternatively, the LCD panel 76 may be automatically rotated by the rotation of the motor 80.

At this time, the light source 73 emits a large amount of light that is proper for the projecting operation. This light is transmitted to the front surface of the LCD panel 76.

Although this light source 73 initially faces the rear surface of the LCD panel 76, the light source 73 can face the front surface of the LCD panel 76 by rotating the LCD panel 76 to its inverted position for carrying out the projecting function.

At this time, the image displayed on the LCD panel 76 according to the image signals received from the system body 71 is at a vertically inverted state, as shown in FIG. 6c, similar to the LCD panel 76.

The inverted image is then projected by the light from the light source 73 on an external screen through the polarizing plate 82 and the focusing lens unit 77, as shown in FIG. 4d. At this time, the displayed image is at a normal state, similar to an original image.

As apparent from the above description, the present invention provides the following effects:

First, the present invention provides an improved view finder. Accordingly, the electronic movie camera system of the present invention achieves both the view finding function and the projecting function. This makes it possible to maximize the functions of the movie camera system.

Second, the movie camera system of the present invention can project the image being shot, so that several people can monitor the image through a large screen. In particular, this projecting function is more advantageous at outdoor places where no TV receiver or monitor is installed.

Third, the user need not purchase a separate projector, in that the movie camera system of the present invention has the projecting function. Accordingly, the movie camera system is economical.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A movie camera system comprising:
   a system body having an image signal;
   a housing mounted on said system body;
   a display element disposed within said housing and adapted to display an image corresponding to the image signal received from the system body;
   a focusing lens unit mounted to one end of the housing disposed on one side of said display element and adapted to project the displayed image on an external screen;
   a back light disposed on the one side of the display element to emit a view finding light;
   a polarizing plate disposed on another side of the display element;
   a view finder coupling unit selectively attached to the other end of the housing disposed on the another side of the display element, said view finder coupling unit having an eye lens; and
   a projector coupling unit selectively attached to the other end of the housing, said projector coupling unit having a light source for emitting a projecting light and a condensing lens for said projecting light,
   whereby said movie camera system is capable of both a view finding operation and a projecting operation.

2. A movie camera system in accordance with claim 1, wherein said back light is engaged with a guide groove disposed in the housing, the back light being capable of rotating while being guided along the guide groove 3. A movie camera system in accordance with claim 1, further comprising a fan disposed near the one end of said housing on a portion of the system body and adapted to discharge heat generated from said light source.

4. A movie camera system in accordance with claim 1, wherein said projector coupling unit comprises a housing member and a plurality of heat discharge ports disposed at said housing member.

5. A movie camera system in accordance with claim 1, wherein said light source of the projector coupling unit is a halogen lamp.

6. A movie camera system in accordance with claim 1, further comprising a polarizing plate disposed between said focusing lens unit and said back light.

7. A movie camera system in accordance with claim 1, wherein said display element is a liquid crystal display panel.

8. A movie camera system in accordance with claim 1, wherein said focusing lens unit comprises a plurality of convex lenses.

9. A movie camera system comprising:
   a system body having an image signal;
   a housing fixedly mounted on said system body;
   a light source disposed within said housing and mounted to one end of the housing, said light source being adapted to provide light for one of a view finding operation and a projecting operation;
   a condensing lens disposed at one side of and near said light source;
   a polarizing plate disposed at one side of said condensing lens;
   a display element rotatably disposed at one side of said polarizing plate to be vertically invertible and adapted to display an image based on the image signal received from the system body; and
   a focusing lens unit disposed within the housing and fixedly mounted to another end of the housing, said focusing lens unit being adapted to selectively enable the displayed image to be seen therethrough and project the displayed image on an external screen,
   whereby said movie camera system is capable of both a view finding operation and a projecting operation.

10. A movie camera system in accordance with claim 9, wherein said display element is a liquid crystal display panel.

11. A movie camera system in accordance with claim 9, wherein said display element has a shaft rotatably mounted at both ends thereof to said housing and the movie camera system further comprises means for rotating the display element, said rotating means comprising a knob fixedly mounted to one end of said shaft protruded outwardly of the housing to allow manual rotation of the display element.

12. A movie camera system in accordance with claim 11, wherein said means for rotating said display element further includes a motor for rotating said shaft to rotate the display element.

13. A movie camera system in accordance with claim 9, wherein said light source is a halogen lamp and an amount of light from the light source is adjustable, depending on a selection between the view finding operation and the projecting operation.

14. A movie camera system in accordance with claim 9, further comprising a polarizing plate disposed between said display element and said focusing lens unit.

15. A movie camera system in accordance with claim 9, further comprising a fan disposed at a portion of the system body beneath the light source and adapted to discharge heat generated from said light source.

16. A movie camera system in accordance with claim 9, wherein said housing has a plurality of heat discharge ports near said light source.

17. A movie camera system in accordance with claim 9, wherein said focusing lens unit comprises a plurality of convex lenses.

18. A movie camera system in accordance with claim 1, further comprising a bracket fixedly mounted to the system body, said housing being rotatably mounted to the bracket.

19. A movie camera system in accordance with claim 1, wherein said back light is pivotally mounted at one end thereof to said housing, said back light being capable of rotating through an angle of approximately 90°, according to a rotation of the housing.

20. A movie camera system in accordance with claim 8, wherein said focusing lens unit further comprises at least one concave lens.

21. A movie camera system in accordance with claim 17, wherein said focusing lens unit further comprising at least one concave lens.

* * * * *